Figure 1:
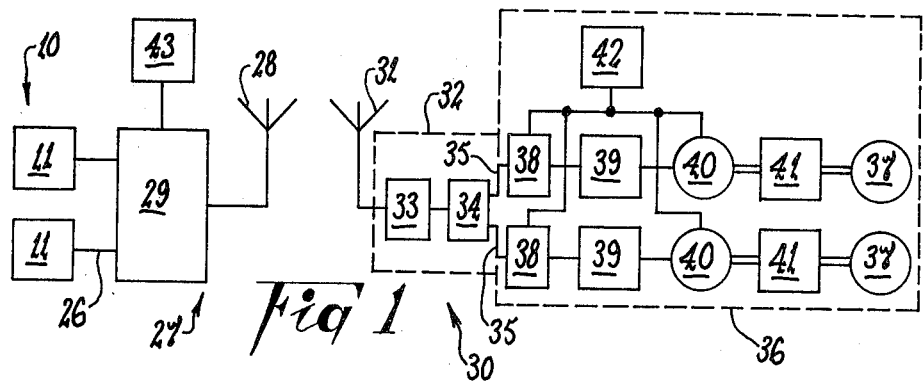

United States Patent [19]

Keeler et al.

[11] 4,440,366
[45] Apr. 3, 1984

[54] PARACHUTE CONTROL APPARATUS

[75] Inventors: Arthur A. Keeler, Mt. Waverley; William M. Rice, Altona; Edward C. Tremayne, North Coburg, all of Australia

[73] Assignee: Commonwealth of Australia, Canberra, Australia

[21] Appl. No.: 317,882

[22] Filed: Nov. 3, 1981

[30] Foreign Application Priority Data

Nov. 3, 1980 [AU] Australia .............................. PE6289

[51] Int. Cl.³ .............................................. B64D 17/34
[52] U.S. Cl. ................................. 244/138 R; 244/152; 46/254; 74/99 A; 338/148; 338/153
[58] Field of Search ............... 244/138 R, 236, 138 A, 244/75 R, 142, 152, 147, 149, 150; 338/148, 164, 143, 153, 202, 162; 340/825.72, 696; 318/16, 581; 46/254; 74/89.15, 89, 99 R, 99 A, 55, 56

[56] References Cited

U.S. PATENT DOCUMENTS

| | | | |
|---|---|---|---|
| 2,427,979 | 9/1947 | Sorensen | 244/75 R |
| 2,490,844 | 12/1949 | Sorensen | 318/16 |
| 2,528,520 | 11/1950 | Jackson et al. | 74/89 |
| 2,925,234 | 2/1960 | Wodal et al. | 244/236 |
| 2,966,316 | 12/1960 | Ward et al. | 340/825.72 |
| 3,146,976 | 9/1964 | Houdou | 244/152 |
| 3,193,223 | 7/1965 | Davis | 244/149 |
| 3,319,925 | 5/1967 | Kojima et al. | 74/99 |
| 3,433,441 | 3/1969 | Cummings | 244/152 |
| 3,437,282 | 4/1969 | Honkonen et al. | 338/143 |
| 4,175,722 | 11/1979 | Higgins | 244/152 |

Primary Examiner—Galen L. Barefoot
Attorney, Agent, or Firm—Cushman, Darby & Cushman

[57] ABSTRACT

A parachute control apparatus for enabling control of an unmanned slave parachute from a manned simultaneously descending parachute is described. The apparatus includes two hand held master controllers each comprising a body and a thumb operable reciprocating plunger. The plunger is coupled to a potentiometer to provide proportional control. The parachutist carries a radio transmitter including an encoder responsive to the plunger movements and an antenna. A control signal receiver is attached to the load carried by the slave parachute and includes a receiving antenna and signal decoder operative to provide drive signals for a slave parachute control line drive. The drive includes a servo system, electric motors, gearboxes and winches for operating the slave parachute control lines.

8 Claims, 4 Drawing Figures

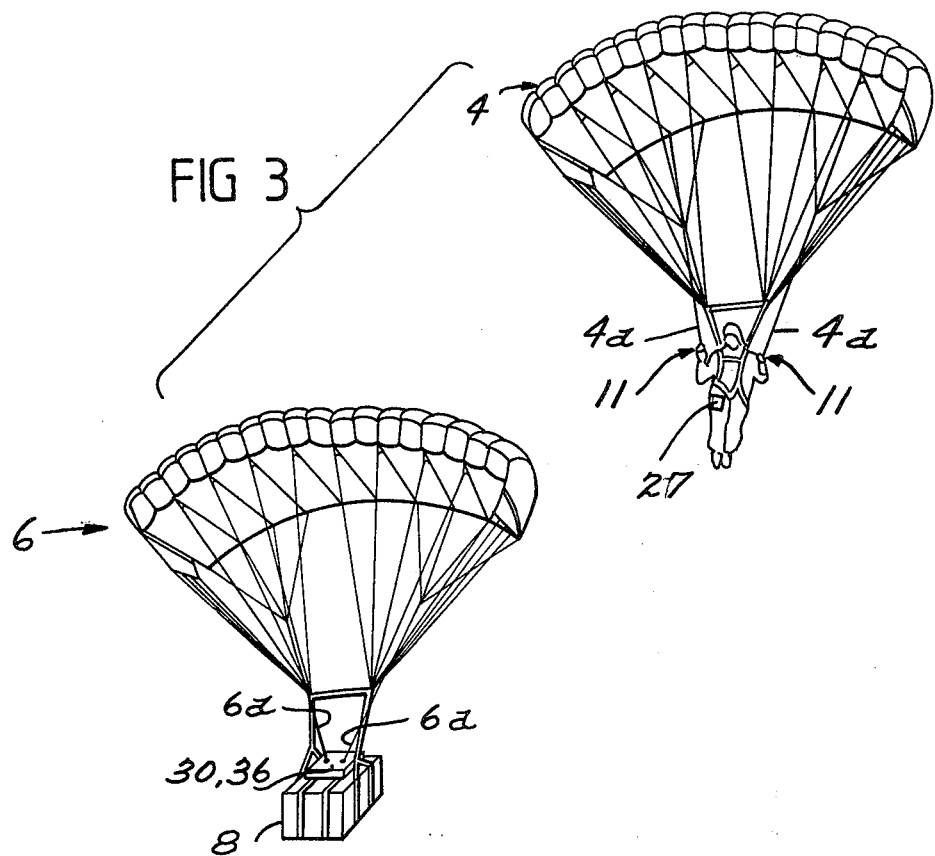
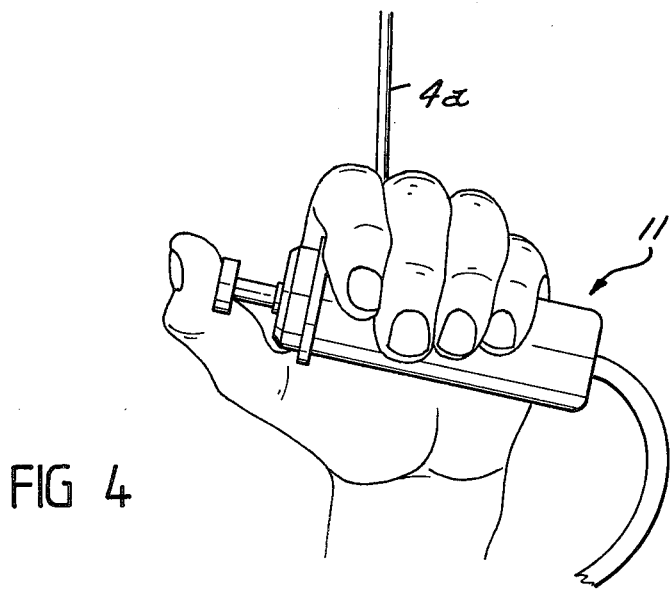

PARACHUTE CONTROL APPARATUS

This invention relates to apparatus for controlling the descent path of an unmanned or slave parachute by a remote operator, specifically by a parachutist under canopy.

Apparatus has been developed for controlling the descent path of a slave parachute from the ground. That apparatus has been relatively bulky and effective use requires that the slave parachute be kept in sight so presenting a difficulty during the night and during bad weather. Also the ground controller has difficulty judging the parachute's direction of descent and distance at least until the parachute is relatively near to the desired drop zone.

It is an object of the present invention to provide apparatus enabling the control of the descent path of a slave parachute from a manned and simultaneously descending parachute.

The prior art control apparatus has not been suitable for the foregoing purpose because it is relatively bulky. Air to air control of a slave parachute has the advantage of not requiring the operator to be already located on the ground at the drop zone. Furthermore visual contact from a parachutist who is simultaneously descending with the slave parachute is possible even in relatively adverse weather conditions.

According to the present invention there is provided parachute control apparatus for enabling control of the descent path of a slave parachute from a manned and simultaneously descending parachute, the apparatus including:

hand operable master controlling means selectively operable by a parachutist, a control signal transmitter adapted to be carried by the parachutist and responsive to operation of the master controlling means to transmit control signals to the slave parachute, a control signal receiver adapted to be carried by the slave parachute and operative to respond to the control signals received from the transmitter by generating appropriate drive signals, and control line drive means adapted to be operatively associated with control lines of the slave parachute and responsive to the drive signals of thre control signal receiver to operate the control lines of the slave parachute and control the descent path thereof.

Preferably the master controlling means is arranged to be hand held by the parachutist and enables simultaneous control of the parachutist's own parachute. The preferred arrngement of master controlling means comprises two hand held master controllers, one for each hand of the parachutist. Each master controller comprises a body portion adapted to be grasped within the hand of the parachutist and a thumb operable plunger projecting from one end of the body portion and selectively slidable within the body portion.

Depression of the right hand controller plunger produces a slave parachute response corresponding to pulling on the right hand control line toggle of the parachutist's own parachute and likewise for the left hand master controller.

Figure 2:
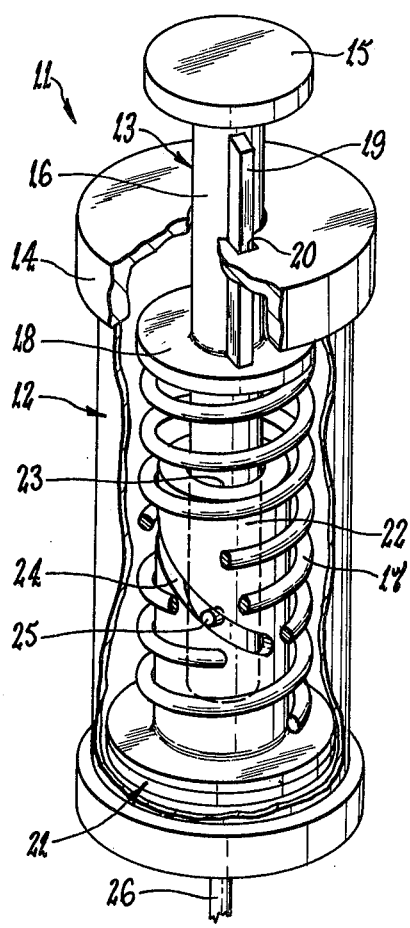

A preferred embodiment of the present invention will now be described with reference to the accompanying drawings in which:

FIG. 1 is a block diagram of parachute control apparatus according to the present invention, FIG. 2 shows one possible construction of a hand held master controller for use with the present invention, FIG. 3 is a schematic view showing a descending parachutist and a descending unmanned slave parachute, and FIG. 4 is a fragmentary view showing a master controlling means in one hand of the parachutist of FIG. 3.

The apparatus shown in the drawings includes hand operable master controlling means 10 selectively operable by a parachutist. The master controlling means 10 is arranged to be hand held by the parachutist and enables simultaneous control of the parachutist's own parachute. The master controlling means 10 comprises two hand held master controllers 11, one for each hand of the parachutist.

FIG. 3 illustrates the parachutist 2, his parachute 4 and a slave parachute 6 carrying a load 8. The main parachute 4 can be controlled by control lines 4a, and the slave parachute 6 can be controlled by control lines 6a.

As shown in FIG. 2 each master controller 11 comprises a body portion 12 adapted to be grasped within the hand of the parachutist and a thumb operable plunger 13 projecting from one end of the body portion 12 and selectively slidable within the body portion 12. The body 12 is of generally cylindrical from and may have a diameter not greater than 25mm and a length between 100 and 150mm. It is preferred to form the outer surface of the body 12 so as to have a non-slip characteristic and that may be achieved by knurling the outer surface. The body 12 also includes a lateral skirt or flange 14 extending around the plunger end of the body 12 and having an external size and confuguration such as to restrain the body against slipping through the operator's grasp due to application of thumb pressure to the plunger 13. The body 12 may be made of any suitable material such as metal or plastics.

The plunger 13 comprises a head portion 15 located externally of the body portion 12 and arranged to be contacted by the parachutist's thumb and a spindle 16 slidably mounted within the body portion 12, the plunger 13 being biased outwardly by spring 17 acting against disc 18 secured to the spindle 16 and against the force applied by the operator's thumb. The spring 17 may exert a reaction force of about 20 newtons (4½ lbs) at full depression of the plunger 13. It is further preferred that the maximum travel of the plunger be relatively short — e.g. about 15mm. The spindle 16 is provided with a key 19 and the plunger end of the body 12 with a keyway 20 to allow reciprocating movement of the plunger 13 but prevent rotation thereof.

The spindle 16 is operatively coupled to a potentiometer 21 operable over substantially the full range of movement of the plunger 13. The potentiometer 21 is provided with a rotary sliding contact and the apparatus includes a tubular cam member 22 coupled to the sliding contact and having a central bore 23 into which the spindle 16 extends. The bore 23 has a helical cam track 24 along at least part of its length and the spindle 16 has a pin 25 extending therefrom projecting into the helical cam track 24, the arrangement being such that reciprocating movement of the spindle 16 is translated by the cooperating pin 25 and helical cam track 24 into rotary movement of the cam member 22 and hence the sliding contact of the potentiometer 21. The potentiometer 21 may include a switch operable on first movement of the plunger 13 from the fully extended position, the purpose of which will be explained later.

Of course, instead of the rotary type potentiometer 21 it is possible to use a linear slide potentiometer mounted inside the body 12, the spindle 16 being operatively coupled to the movable contact of the slide potentiometer.

Flexible power line 26 is connected to the potentiometer 21 and extends from the end of the body 12 remote from the plunger end to other parts of the control apparatus carried by the parachutist or his parachute.

In use of the master controlling means 10 as described above, the two master controllers 11 may be stowed inside pockets located in the sleeves or other parts of a garment worn by the parachutist. Following the deployment of both canopies and having satisfied himself that his own and the slave canopies are correctly positioned and in stable descent, the operator temporarily releases his own parachute's control line toggles 4a and crossing over his arms extracts the controllers from their stowed positions inside the sleeves of his suit. Taking one controller body 12 in each hand he reaches up to relocate his control line toggles 4a and holds them together with the controllers 11. Now by selectively pulling on his own control lines, he can control his own parachute in direction and glide angle and by selectively depressing and releasing the plungers 13 the slave parachute can be simultaneously controlled as described below. The two controllers are preferably arranged so that depression of the right hand controller plunger 13 produces a slave parachute response corresponding to pulling on the right hand control line toggle of the operator's parachute and likewise for the left hand master controller 11 so that the apparatus has natural mnemonic operating characeristics.

The parachute control apparatus of the present invention further includes a control signal transmitter 27 adapted to be carried by the parachutist and which is responsive to the hand operable master controlling means 11 for transmitting control signals to the slave parachute. In the FIG. 1 embodiment the control transmitter 27 operates by radio transmission although optical or acoustic transmissions may be possible. The radio signals may be AM, FM or advance/stop/reverse coded signals, but the radio signals are preferably pulse-width-modulated so that equipment similar to that used in controlling model airplanes may be used.

The control signal transmitter 27 includes a power source 43 such as dry cell batteries although any other suitable source may be used. The control signal transmitter also includes an encoder 29 for translating variations of the controller potentiometer position into control signals representative of the desired manoeuvres of the slave parachute. For example the encoder 29 may be a standard commercial two channel pulse-width-modulated control transmitter responsive to the potentiometer settings of the hand held master controllers 11.

The control signal transmitter 27 further includes a radio transmitting antenna 28 which is horizontally polarised since it is envisaged that the parachutist will optimally position himself above and behind the slave parachute. Preferably the transmitting antenna 28 is of dimensions such that a half wave dipole (needing no ground plane) would be about the same as the span of a man's shoulders. Thus a wavelength of a metre of less is implied, corresponding to a frequency of 300 MHz or more, which would also suit the application in that it would be within the military aeronautical UHF band of 225–400 MHz. Thus preferably the transmitting antenna carried by the parachutist is a centre-fed half-wave dipole, of approximately 480mm from tip to tip. The half-elements are preferably flexible and of such a nature as to spring back after being flexed and may be tipped with silicone rubber or the like to reduce the risk of injury from the ends of the conductors. A centre insulator of moulded polyester resin or other suitable material, may encapusulate the coaxial cable connections and mechanically unite the whole assembly. The coaxial cable may be about 1 meter long, which would permit the antenna to be worn almost anywhere on the parachutist's person, e.g. across the shoulders or tucked into the waist-band.

The complete control system carried by the parachutist thus comprises two hand controllers 11, an antenna 28 and a small self-contained transmitter 43,29. These items are interconnected by flexible cables preferably worn under the parachutist's clothing in such a way as not to restrict his movements.

It has been found that including batteries, the complete parachutist's assembly can be packaged into a case 118×62×39mm and weighing about 400 grams. The unit can thus be carried in a pocket or, as found convenient by Army parachutists, under elastic webbing straps which retain a dual altimeter panel to the chest-pack reserve parachute.

The parachute control apparatus of the present invention also includes a control signal receiver 30 which is adapted to be carried by the slave parachute and is operative to respond to the control signals received from the transmitter by generating appropriate drive signals. The control signal receiver 30 is preferably detachably mounted in or on the load of the slave parachute, which may be a stores bundle or the like. For example, the receiver 30 may be mounted in a housing arranged to be strapped to the outside of a stores bundle adjacent the stowed slave parachute. The control lines of the slave parachute may pass through respective holes in the housing.

The control signal receiver 30 includes a receiving antenna 31 and that may be of similar construction to the transmitting antenna 28. The control signal receiver further includes a decoder 32 for translating control signals received by the antenna 31 so as to produce drive signals for the slave parachute. The decoder 32 in FIG. 1 includes a signal converter 33 for transforming the received signal to a carrier frequency used by a radio-control receiver 34 such as a two channel airborne radio-control receiver which operates on lower frequency signals and produces electrical drive outputs on lines 35 corresponding to the two control channels.

The apparatus includes control line drive means 36 adapted to be operatively associated with control lines 4a of the slave parachute 4 and responsive to the drive signals of the control signal receiver 30 to operate the control lines 4a of the slave parachute and control the descent path thereof. The drive means 36 includes two drive winches 37 arranged for connection to the control lines of the slave parachute so as to selectively haul on and release the control lines and thereby control the descent path of the slave parachute. The winches 37 are preferably operable to take up approximately the same amount of line as a manned parachute, — e.g. about 660 mm of line — and that is preferably achieved in approximately 3 to 4 seconds. The winches 37 are capable of exerting adequate forces on the slave parachute control lines (typically 160 newtons for small ram-air canopies).

The drive means 36 further includes two servo units 38 driven by the receiver drive output signals so as to take up angular positions corresponding to the control signals and including respective potentiometers. The potentiometers are connected to relatively high power motor-control servo amplifers 39 which in turn control the power supplied to respective electric motors 40. The motors 40 are of any suitable constuction and drive the winches 37 through respective gearboxes 41. The drive means 36 includes a power supply 42 such as sealed lead-acid batteries, e.g. Yuasa NP6-12 type batteries.

The parachute control apparatus may include other components as required such as regulated power supplies for the signal converter 33 and control receiver 34 and control and calibration panels for the servos 38,39.

The apparatus of the present invention may be used with any conventional parachutes including both round and square (ram-air) canopies. The invention has been successfully tested with conventional MC3 type canopies and square ram-air canopies. With ram-air canopies it was found that inclusion of means to reef the canopy to partial drive during deployment and then automatically de-reef upon receiving the first control signal improved reliability of deployment. The first operation of the switch associated with the potentiometers 21 may be used to generate the signal causing de-reefing of the slave canopy.

The embodiment of the parachute control apparatus described above may be used as follows. The load of the slave parachute which includes the control signal receiver 30 and control line drive means 36 along with a stores bundle is positioned on the open rear ramp of an aircraft at the designated despatch altitude. The controller prepares to follow it from the aircraft and switches on his transmitter 27 approximately one minute before jumping.

As the aircraft approaches the selected release point a despatcher may give a brief count down and the controller and/or other parachutist lift and tip the slave parachute load from the aircraft and then follow it out. As the slave parachute load leaves the aircraft a static line attached to the aircraft releases the spring loaded drogue pack and the drogue deploys immediately. The load falls with drogue only deployed during a free fall phase stabilizing its attitude and limiting its terminal velocity so that the parachutist can formate on it or at least remain reasonably close.

At a preset altitude sensed by a barometric altimeter an automatic opening device may be operable to release the attachment between drogue and bundle thus enabling the drogue line to extract the main canopy from its pack. Simultaneously it pulls a safety lock pin from a socket to activate the load receiver and control system. The main canopy deploys under aerodynamic forces and rapidly reduces the rate of descent.

At about the same time the controller deploys his own canopy 4 by manual control. The operator locates his own canopy control line toggles 4a and positions himself if possible about 100 meters above and behind the slave 6 and travelling in the same direction.

The operator then releases his own control line toggles 4a and extracts the controllers 11 from their stowed positions inside the sleeves of his suit as described hereinbefore. Then, relocating his control line toggles, he holds them together with the master controllers 11. By pulling on his own control lines he can control his own parachute in direction and glide angle. By a similar depression of the plungers 13 with his thumbs he can, via the radio link and servo system, produce similar movement of the slave parachute control lines 6a.

The operator can thus steer the load 8 towards the selected drop zone turning it upwind before touchdown or earlier if necessary while steering his own canopy similarly to retain formation. The operator brakes the load by pressing both plungers 13 down immediately prior to touchdown to stall the load and prevent or reduce the possibility of it rolling over on touchdown. The operator lands shortly after the load and after detaching himself from his canopy he switches off the transmitter 27. He also may replace the load lock pin to deactivate the load control signal receiver 30.

It will be appreciated that various modifications and additions may be made to the apparatus as herein described without departing from the scope of the invention as defined in the appended claims. By way of example each of the master controllers 11 may be operable by flexing of a finger or by lateral movement of a thumb rather than by depression of a plunger with the thumb.

What we claim is:

1. Parachute control apparatus for enabling control of the descent path of slave parachute from a manned and simultaneously descending parachute, the apparatus including:

hand operable master controlling means selectively operable by a parachutist, and comprising two hand held master controllers, one for each hand of the parachutist, the master controllers being arranged to be held together with the parachutist's control line toggles whereby the parachutist can selectively pull on his own control line to control his own parachute in direction and glide angle and can simultaneously selectively operate the master controllers, a control signal transmitter adapted to be carried by the parachutist and responsive to operation of the two master controllers to transmit respective control signals to the slave parachute, a control signal receiver adapted to be carried by the slave parachute and operative to respond to the control signals received from the transmitter by generating appropriate drive signals, and control line drive means adapted to be operatively associated with control lines of the slave parachute and responsive to the drive signals of the control signal receiver to operate the control lines of the slave parachute and control the descent path thereof.

2. Parachute control apparatus for enabling control of the descent path of a slave parachute from a manned and simultaneously descending parachute, the apparatus including hand operable master controlling means selectively operable by a parachutist, and comprising two hand held master controllers, one for each hand of the parachutist, each master controller comprising a body portion adapted to be grasped within the hand of the parachutist and a thumb operable plunger projecting from one end of the body portion and selectively slidable within the body portion, the body portion being arranged to be held against and together with respective one of the parachutist's control line toggles whereby the parachutist can selectively pull on his own control lines to control his own parachute in direction and glide angle, each plunger comprising a head portion located externally of the body portion and arranged to be contacted by the respective thumb of the parachutist and a spindle slidably mounted within the body portion, the plunger being biased outwardly against the force applied by the parachutist's thumb, each plunger being selectively operable by the parachutist simultaneously with operation of his own parachute's control lines, each master controller further including a potentiometer to which the spindle is operatively coupled so that the potentiometer is operable over substantially the full range of movement of the plunger, the potentiometer being provided with a rotary sliding contact and a cam member coupled to the sliding contact and having a central bore into which the spindle extends, the bore having a helical cam track along at least part of its length and the spindle having a pin extending therefrom projecting into the helical cam track, the arrangement being such that reciprocating movement of the spindle is translated by the cooperating pin and helical cam track into rotary movement of the cam member and hence the sliding contact of the potentiometer, the parachute control apparatus further including a control signal transmitter adapted to be carried by the parachutist and responsive to operation of the two master controllers to transmit respective control signals to the slave parachute, a control signal receiver adapted to be carried by the slave parachute and operative to respond to the control signals received from the transmitter by generating appropriate drive signals, and control line drive means adapted to be operatively associated with control lines of the slave parachute and responsive to the drive signals of the control signal to operate the control lines of the slave parachute and control the descent path thereof.

3. Parachute control apparatus according to claim 1 wherein each master controller comprises a body portion adapted to be grasped within the hand of the parachutist and a thumb operable plunger projecting from one end of the body portion and selectively slidable within the body portion.

4. Parachute control apparatus according to claim 3 wherein the plunger comprises a head portion located externally of the body portion and arranged to be contacted by the parachutist's thumb and a spindle slidably mounted within the body portion, the plunger being biased outwardly against the force applied by the operator's thumb.

5. Parachute control apparatus according to claim 4 wherein the spindle is operatively coupled to a potentiometer operable over substantially the full range of movement of the plunger.

6. Parachute control apparatus according to any one of claims 3, 4, 5, or 2, wherein depression of the right hand master controller plunger produces a slave parachute response corresponding to pulling on the right hand control line toggle of the parachutist's own parachute and likewise for the left hand master controller.

7. Parachute control apparatus according to claim 1 or claim 2 wherein the control signal transmitter includes a horizontally polarised radio transmitting antenna.

8. Parachute control apparatus according to claim 9 wherein the antenna is a centre-fed half-wave dipole.

* * * * *